(12) United States Patent
Karlberg et al.

(10) Patent No.: US 11,947,822 B2
(45) Date of Patent: Apr. 2, 2024

(54) MAINTAINING A RECORD DATA STRUCTURE USING PAGE METADATA OF A BOOKKEEPING PAGE

(71) Applicant: Microsoft Technology Licensing, LLC, Redmond, WA (US)

(72) Inventors: Jan-Ove Almli Karlberg, Tromso (NO); Tor Kreutzer, Tromso (NO)

(73) Assignee: Microsoft Technology Licensing, LLC., Redmond, WA (US)

( * ) Notice: Subject to any disclaimer, the term of this patent is extended or adjusted under 35 U.S.C. 154(b) by 187 days.

(21) Appl. No.: 17/710,914

(22) Filed: Mar. 31, 2022

(65) Prior Publication Data
US 2023/0315321 A1    Oct. 5, 2023

(51) Int. Cl.
 *G06F 16/00*  (2019.01)
 *G06F 3/06*   (2006.01)
 *G06F 16/22*  (2019.01)

(52) U.S. Cl.
 CPC .......... *G06F 3/0644* (2013.01); *G06F 3/0604* (2013.01); *G06F 3/0655* (2013.01); *G06F 3/0679* (2013.01); *G06F 16/2228* (2019.01)

(58) Field of Classification Search
 CPC .................................................. G06F 16/2228
 See application file for complete search history.

(56) References Cited

U.S. PATENT DOCUMENTS

| 9,959,279 B2 | 5/2018 | Archak et al. |
| 10,922,740 B2 | 2/2021 | Gupta et al. |
| 2014/0181071 A1 | 6/2014 | Pidduck et al. |
| 2014/0289658 A1 | 9/2014 | Gelernter et al. |
| 2020/0372004 A1 | 11/2020 | Barber et al. |
| 2022/0382651 A1* | 12/2022 | Lu ........................ G06F 11/1471 |

FOREIGN PATENT DOCUMENTS

| CN | 114185991 A | 3/2022 |
| EP | 3767486 A1 | 1/2021 |
| WO | 2021/0016050 A1 | 1/2021 |

OTHER PUBLICATIONS

"International Search Report and Written Opinion Issued in PCT Application No. PCT/US23/010880", dated May 9, 2023, 14 Pages.
(Continued)

*Primary Examiner* — Ajith Jacob
(74) *Attorney, Agent, or Firm* — Barta Jones, PLLC

(57) ABSTRACT

The disclosure herein describes processing data operation requests and performing associated operations on pages of a record data structure. A data operation is generated based on a received data operation request. The data operation request includes a bookkeeping page identifier. A bookkeeping page of the record index structure is identified based on the bookkeeping page identifier and an index page of the record index structure with a parameter of the data operation. If a timestamp in metadata of the identified index page matches a corresponding timestamp associated with the identified index page in metadata of the bookkeeping page, the data operation is performed on the identified index page. The disclosure enables the use and maintenance of large data indexes in data storage systems where data entries expire over time due to automatic temporal compaction processes.

20 Claims, 7 Drawing Sheets

(56) References Cited

OTHER PUBLICATIONS

"Adding Indexes for a Key/Value Store", Retrieved From: http://www.tiernok.com/posts/adding-index-for-a-key-value-store/, Jan. 2, 2019, 9 Pages.

"Key-Value Databases", Retrieved From: https://web.archive.org/web/20220121123242/https://www.mongodb.com/databases/key-value-database, Jan. 21, 2022, 7 Pages.

D'Silva, et al., "Secondary Indexing Techniques for Key-Value Stores: Two Rings to Rule Them All", In Proceedings of the Workshops of the EDBT/ICDT Joint Conference, Mar. 21, 2017, 10 Pages.

Nguyen,, et al., "Zing Database: High-Performance Key-Value Store for Large-Scale Storage Service", In Journal of Vietnam Journal of Computer Science, vol. 2, Issue 1, Aug. 17, 2014, pp. 13-23.

Tang, et al., "Deferred Lightweight Indexing for Log-Structured Key-Value Stores", In Proceedings of 15th IEEE/ACM International Symposium on Cluster, Cloud and Grid Computing, May 4, 2015, 10 Pages.

\* cited by examiner

MAINTAINING A RECORD DATA STRUCTURE USING PAGE METADATA OF A BOOKKEEPING PAGE

BACKGROUND

Many modern data storage systems use large indexes in the form of tree structures to enable efficient access to indexed data and performance of operations on that data (e.g., using hash values to organize data within the tree structures). However, in data storage systems where data index entries expire automatically due to automatic temporal compaction, maintenance of such tree structures presents significant challenges.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for processing data operation requests and performing associated operations on pages of a record data structure is described. A data operation is generated based on a received data operation request. The data operation request includes a bookkeeping page identifier. A bookkeeping page of the record index structure is identified based on the bookkeeping page identifier and an index page of the record index structure with a parameter of the data operation. It is determined that a timestamp in metadata of the identified index page matches a corresponding timestamp associated with the identified index page in metadata of the bookkeeping page and, after the determination, the data operation is performed on the identified index page.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 7, the systems are illustrated as schematic drawings. The drawings may not be to scale.

DETAILED DESCRIPTION

Figure 1:
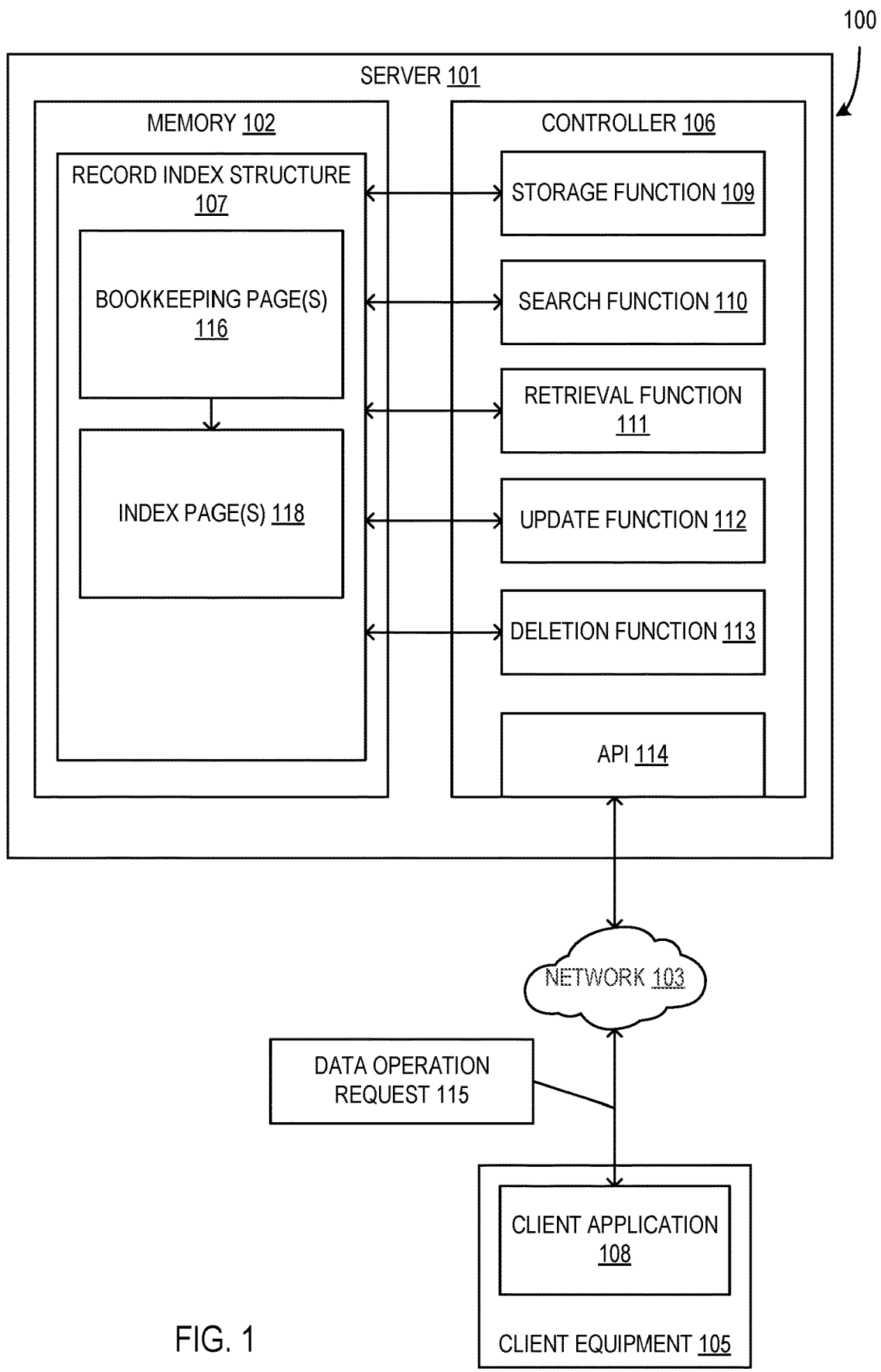
FIG. 1 is a block diagram illustrating a system configured store data in a record index structure using pages.

Aspects of the disclosure maintain a record data structure, and provide a computerized method and system for processing data operation requests directed toward the record index structure and for performing data operations on pages of the record index structure based on the data operation requests. The record data structure is organized to include index pages that store index entries and at least one bookkeeping page that is configured to store metadata of the index pages, including timestamps that are used to verify the consistency of the index pages prior to performing any data operations thereon. Further, the metadata stored in the bookkeeping page is used to identify index pages upon which specific index entries are stored. This structure (using a bookkeeping page which links to multiple index pages) enables storage and maintenance of large quantities of indexed data throughout the performance of requested data operations and/or other processes, such as temporal compaction processes, on the record index structure.

The disclosure operates in an unconventional manner at least by configuring the record data structure to include a bookkeeping page used to maintain and verify metadata of index pages. Because the large index is stored across multiple pages, special care must be taken when operations are executed on the index. For example, the system must ensure that a consistent snapshot of all relevant index pages has been read. The checking of the timestamps of all relevant index pages and corresponding timestamps stored in the bookkeeping page prior to performing any data operation ensures that the system is working with consistent data states throughout those index pages. This consistency verification technique enables many processes to access data in the record data structure without accessing inaccurate data, thus improving the functioning of the underlying computing device.

Further, the disclosure enables the creation and use of multiple pages for the record index structure, such that systems are enabled to create dynamically sized indexes over the data stored in key-value stores, in systems that rely on temporal compaction to reduce operational costs. The described bookkeeping page metadata structures enable efficient maintenance of the overall record index structure in response to changes made during such temporal compaction processes. This efficiency results in improved management and usage of computing resources, such as reduced computational usage, reduced I/O bandwidth, and overall improvement in the functioning of the underlying computing device.

Additionally, the disclosure enables circumvention of "maximum value size" issues associated with other types of large indexes. The described system is enabled to create new pages dynamically in response to increasing quantities of index data to store, as well as dynamically creating additional bookkeeping pages in examples where a single bookkeeping page is insufficient to maintain the record index structure. Further, the disclosed structure enables the use of very large indexes while maintaining minimal input/output (I/O) overhead, low storage overhead, and consistent enumeration/pagination of the indexes.

FIG. 1 is a block diagram illustrating a system 100 configured store data in a record index structure 107 using pages 116-118. The system 100 includes a server system 101 operated by a provider of a storage service (e.g., a cloud storage service provider). The provider could be an individual person, an organization such as a company, or a consortium of individuals and/or organizations. The server system 101 includes one or more server units located at one or more sites or geographic locations. The server system 101 includes memory 102 arranged to store a record index structure 107 (e.g., a large index data structure) that is configured and/or organized as described herein, including at least one bookkeeping page 116 and, optionally, one or more index pages 118.

The bookkeeping page 116 is configured to store page metadata (e.g., page change timestamps, sort value ranges, and/or index entry quantity values), index entry metadata (e.g., a map of index entry identifiers to page identifiers of pages upon which the index entries are stored) and/or index entries themselves. The index page 118 is configured to store index entries and page-specific metadata (e.g., a page change timestamp, a sort value range, and/or an index entry quantity value). The structure and/or features of the bookkeeping pages 116 and index pages 118 are described in greater detail below with respect to at least FIG. 2.

In some examples, the memory 102 includes any form and quantity of memory devices managing one or more storage media (e.g., storage media as described below with respect to FIG. 7).

Further, the server system 101 includes a controller 106. In some examples, the controller 106 includes hardware, firmware, and/or software configured to communicate with client applications 108 and/or perform the functions 109-113 as described herein. Additionally, or alternatively, the controller 106 includes one or more processing devices (e.g., central processing units (CPUs) or other processing components described below with respect to FIG. 7).

In some examples, the controller 106 is configured to perform a storage function 109, a search function 110, a retrieval function 111, an update function 112, and a deletion function 113. Further, the controller 106 includes an application programming interface (API) 114 configured to enable an external client application 108 run on an external client computer equipment 105 to connect to the controller 106 in order to request that such operations be performed. The API 114 interface between the client application 108 and the functions of the controller 106 to handle data operation requests 115 from the client application 108 and to respond to requests 115 with results of the functions.

Further, in some examples, the requesting client equipment 105 includes one or more computer units at one or more geographic sites. For instance, the client equipment 105 includes a user terminal such as a desktop computer, laptop computer, tablet, smartphone, or wearable device such as a smart-watch or smart-glasses. Alternatively, or additionally, the client equipment 105 includes another server device operated by a party other than the provider of the storage service. In another example, the client application 108 is implemented on the same server system 101 as the controller 106, but for illustrative purposes, it is described herein as being implemented on a separate external client equipment 105 as illustrated.

In other examples, different requests 115 for different operations are sent by different client applications 108 on the same or different computer equipment 105 without departing from the description herein.

In some examples, the client application 108 connects to the API 114 via one or more networks 103 (e.g., a wide area internetwork such as the Internet, another wide area network such as a mobile cellular network, satellite network or public switched telephone network (PTSN); a wireless local area network such as Wi-Fi, Bluetooth, 6LoPAN, Thread, or ZigBee; and/or a wired intranet such as an Ethernet network, Token Ring network, or Fiber Distributed Data Interface (FDDI) network, or the like).

The client application 108 is enabled to make requests 115 for the performance of the functions 109-113 on the record index structure 107 by sending the requests 115 to the API 114 via the connection over the one or more networks 103. In some examples, the client application 108 includes a user application, and any one or more of the requests 115 are initiated by a user of the client application 108 via a user interface of the client application 108 presented through the respective client equipment 105. Alternatively, or additionally, the client application 108 includes an automated application and any one or more of the requests 115 are initiated autonomously from an automated function of the client application 108.

In examples where a request 115 is sent to store (e.g., add or write) a new data record, the API 114 triggers the storage function 109 to perform a storage operation to add a new record to the record index structure 107 based on the submitted request 115. In examples where a request 115 to search for a data record is sent, the API 114 triggers the search function 110 to perform a search operation to search the record index structure 107 based on the submitted request 115. In examples where a request 115 to retrieve (e.g., read) existing records is sent, the API 114 triggers the retrieval function 111 to perform a retrieval operation to retrieve the requested record(s) from the record index structure 107 based on the submitted request 115. In examples where a request 115 to update a data record is sent, the API 114 triggers the update function 112 to perform an update operation on the targeted data record(s) in the record index structure 107 based on the submitted request 115. In examples where a request to delete a data record is sent, the API 114 triggers the deletion function 113 to perform a deletion operation on the targeted data record(s) in the record index structure 107 based on the submitted request 115.

In some examples, the system 100 includes more and/or different servers that can be accessed by the client application 108 as described herein. Additionally, or alternatively, in some examples, the server 101 includes more and/or different record index structures without departing from the description. Further, in some examples, the server 101 and associated record index structure 107 is accessed by more and/or different client applications 108 (simultaneously or in such a way that multiple operations are performed on the record index structure 107 during the same time period) without departing from the description. In some examples, the server 101 includes multiple co-processes that operate in parallel for performing functions 109-113 as requested by one or more client applications 108.

In some examples where multiple types of record index structures are present on the server 101, requests 115 from the client application 108 are configured to indicate the type of record index structure to be affected by the requested function. For instance, a first request 115 includes key data and parameter data that indicates a specific index structure and a record to read from that index structure, while a second request 115 includes key data that is indicative of a bookkeeping page 116 of the record index structure 107 and parameter data that is indicative of query parameters for the function to be performed on the record index structure 107. Further, in some examples, such requests 115 include continuation tokens for tracking pagination through the record index structure 107 as described in greater detail below with respect to FIG. 5.

Additionally, in some examples, requests 115 from client applications 108 include requests to access and/or interact with multiple parts of the record index structure 107. In such examples, the multiple operations are performed in parallel, iteratively, or by iterating through batches of operations that are performed in parallel with each other. In other examples, other methods of organizing the performance of operations are used without departing from the description. For instance, in an iterative configuration, if a request 115 includes requests to access an "Index A" and an "Index B", then all the operations for Index A are performed prior to the performance of the operations for Index B. Such an iterative configuration reduces the quantity of memory being used by the co-process instance. However, this configuration does increase latency (e.g., compared to parallel processing configurations) in cases where multiple indexes are queried at the same time. In some examples, the request 115 from the client application 108 is configured to include an indicator of whether the operations are to be performed in parallel or iteratively.

Figure 2:
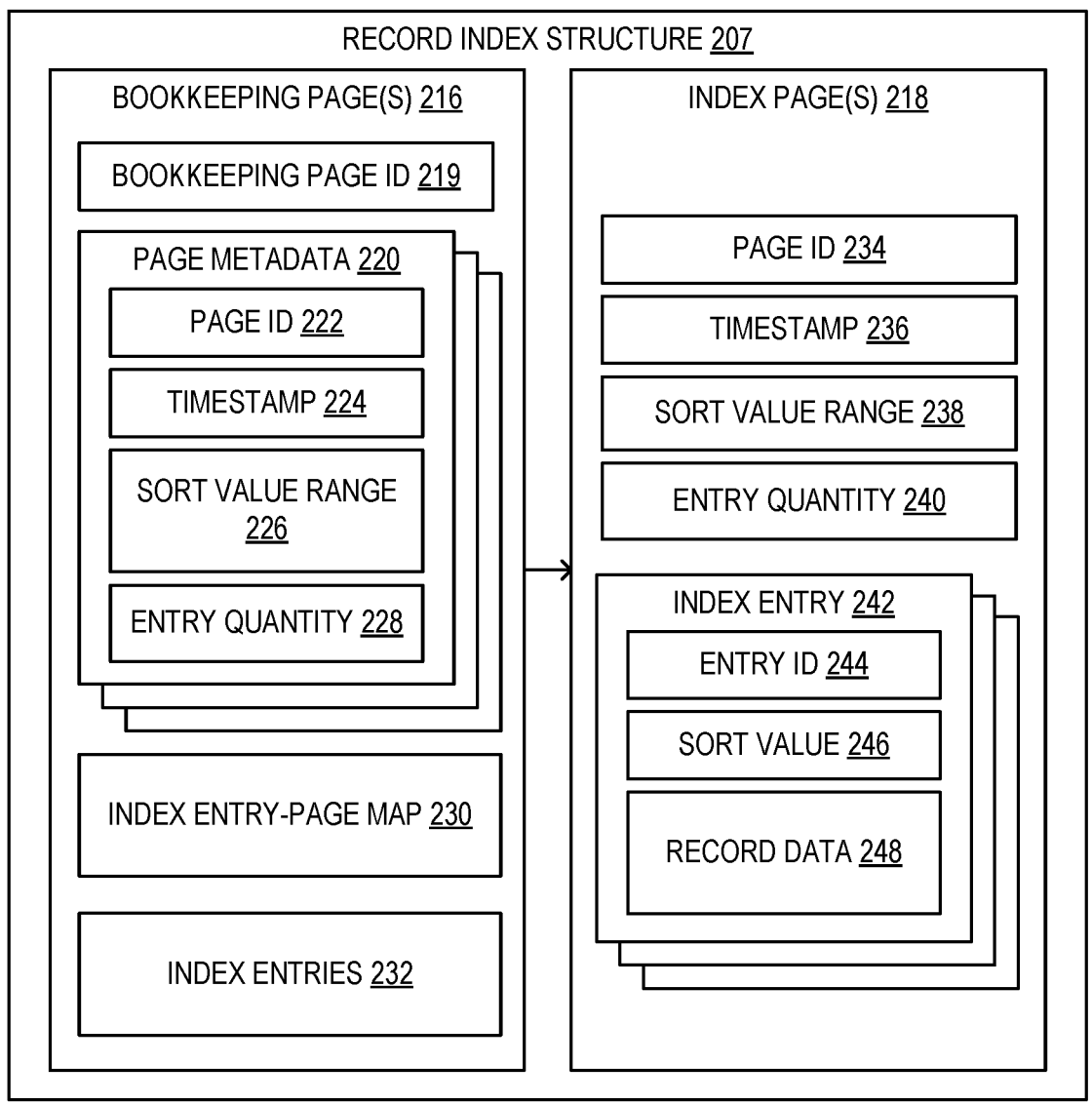
FIG. 2 is a block diagram illustrating a system including a record index structure of bookkeeping pages and index pages.

FIG. 2 is a block diagram illustrating a system 200 including a record index structure 207 of bookkeeping pages 216 and index pages 218. In some examples, the record index structure 207 is part of a system such as system 100 of FIG. 1 as described herein.

The record index structure 207 is configured to store record data (e.g., record data 248) in one or more page structures. In some examples where the record index structure 207 includes a single page, the page is a bookkeeping page 216 that stores page metadata 220, an index entry-page map 230, and index entries 232. Alternatively, in examples where the record index structure 207 includes a plurality of pages, that plurality of pages includes at least one bookkeeping page 216 and one or more index pages 218. It should be understood that, while a single bookkeeping page 216 is illustrated, in other examples, more than one bookkeeping page 216 is used (e.g., extending a first root bookkeeping page 216 with a list or set of additional bookkeeping pages 216 configured to store other page metadata).

In some examples, bookkeeping pages 216 differ from index pages 218 in that the bookkeeping pages store page metadata 220 and an index entry-page map 230. A bookkeeping page 216 is configured to further store index entries 232 as an index page stores index entries 242, given that the bookkeeping page 216 has sufficient storage capacity to do so. For instance, when a record index structure 207 is initiated and it does not yet store large quantities of data, such a record index structure 207 includes a single bookkeeping page 216 configured to store both the bookkeeping metadata (e.g., the page metadata 220 and the index entry-page map 230) and the record data in index entries 232.

Further, the bookkeeping page 216 includes a bookkeeping page identifier (ID) 219 that uniquely or semi-uniquely identifies the bookkeeping page 216 from among other pages of the system 200. The bookkeeping page ID 219 is used during operations that are performed on the record index structure 207 to identify and locate the bookkeeping page 216. In some examples, the bookkeeping page ID 219 is substantially equivalent to the page ID 234 of an index page 218.

The page metadata 220 stored in the bookkeeping page 216 includes sets of metadata for each index page 218 (and/or other bookkeeping pages 216) of the record index structure 207. The page metadata 220 of an index page 218 includes a page ID 222 that can be used to identify and locate the index page 218, a timestamp 224 that is indicative of a last time the index page 218 was written to or otherwise changed, a sort value range 226 that is indicative of the highest and lowest sort values of index entries 242 within the index page 218, and an entry quantity 228 that is indicative of the quantity of index entries 242 stored in the index page 218. The page metadata 220 of an index page 218 is kept up-to-date based on changes occurring to the index page 218 during the operations that cause those changes to occur (e.g., write operations, delete operations, or the like). Examples of such operations are described in greater detail below.

In some examples, the timestamp 224 is used to verify that the page metadata 220 on the bookkeeping page 216 is synchronized with a current state of the associated index page 218. For instance, in many of the example operations described herein, the timestamp 224 stored on the bookkeeping page 216 is compared to the timestamp 236 of the associated index page 218 to verify that the metadata are in sync with each other. Further, the sort value range 226 is used during operations to determine where a data record should be stored in the record index structure 207 and/or to determine which index pages 218 are storing data records with specific sort values 246. Finally, the entry quantity 228 of the page metadata 220 is used to monitor the occupied space of the associated index page 218 and/or the remaining free space of the associated index page 218, enabling the system 200 to determine when to rebalance the index entries 242 in an index page 218 to other pages.

The index entry-page map 230 is a mapping of the entry IDs 244 of index entries 242 to page IDs 234 of the index pages 218 upon which they are stored. In some examples, the system 200 uses the index entry-page map 230 to locate a particular index entry 242 within the record index structure 207 using the index entry-page map 230, enabling the system 200 to quickly identify the index page 218 that contains the index entry 242 being sought.

Additionally, in some examples, a bookkeeping page 216 stores index entries 232 as described above. It should be understood that index entries 232 stored in a bookkeeping page 216 are substantially the same structurally as index entries 242 stored in an index page 218.

Index pages 218 are configured to store record data 248 in index entries 242. In some examples, index pages 218 include metadata that corresponds to the page metadata 220 stored on associated bookkeeping pages 216. In such examples, the page ID 234 corresponds to page ID 222, the timestamp 236 corresponds to timestamp 224, the sort value range 238 corresponds to sort value range 226, and the entry quantity 240 corresponds to entry quantity 228 (in some examples, index pages 218 include PageSpan data structures that include the sort value range 238 and entry quantity 240 of the associated index page 218). Alternatively, in other examples, an index page 218 of the record index structure 207 is configured to include only a page ID 234 for identifying and/or locating the index page 218 in the record index structure 207 and a timestamp 236 that is indicative of a last time that data of the index page 218 was changed. In such examples, the sort value range 238 and entry quantity 240 are maintained in the page metadata 220 on the bookkeeping page(s) 216 only. In still other examples, other organizations of metadata between index pages 218 and bookkeeping pages 216 are used without departing from the description.

Index pages 218 primarily store index entries 242. An index entry 242 is configured to store an entry ID 244 that is used to identify and/or locate the index entry in the record index structure 207, a sort value 246 that is used to sort the index entry 242 among the other index entries in the record index structure 207, and record data 248 which includes the data that is being stored in the record index structure. For example, if the data being stored is transaction data, the record data includes transaction data, such as transaction amount, identifiers of parties to the transaction, or the like. In some examples, the sort value 246 of an index entry 242 is a data value of the record data 248 that is selected to be the sort value 246 for the record index structure 207. For example, the record data is transaction data, and date value of the transaction data is selected as the sort value for the record index structure 207, such that the index entries 242 are sorted based on the date value of the associated record data 248. Alternatively, or additionally, the sort value 246 is not included in the record data 248 without departing from the description.

Further, in some examples, systems that use record index structure 207 as described herein also use other types of data structures, such as more conventional index structures. It should be understood that, in such examples, the record index structure 207 is configured for use with very large sets of data and that other data structures can be used by the system to store smaller data sets that would not take advantage of the described features of the record index structure 207.

In some examples, data storage in the record index structure includes storage on a Graph table that supports storing both data items and indexes in the same underlying storage table/key-value table (e.g., a MICROSOFT Object-Store table). This is achieved by leveraging a RecordType field that is configured to enable delayed deserialization (e.g., Bond inheritance, JSON, or protobuffer usage). At runtime, the RecordType field is evaluated and based on its value, the generic Record field is deserialized accordingly. This pattern, known as delayed deserialization, is described below.

Some data schemas can be expensive to serialize and deserialize. In many examples, this is because of long lists that are organized in nested structures. If it is not necessary to deserialize all of the data in a structure, the structure can be configured to only deserialize portions on demand. In some examples, the RecordType field is configured to use Bond, which supports this with a concept called Bonded <T>. In other examples, other techniques are used to enable delayed deserialization are used without departing from the description. An example of using such on-demand deserialization is provided below. The MyRecord struct is configured to include a nested list of Item structs in the DeserializeOnDemand struct. Because it is "bonded", the list is only deserialized on demand, rather than automatically.

```
struct Item
{
    0: int32 field1;
    1: int32 field2;
}
struct DeserializeOnDemand
{
    3: optional vector<Item> LongListOfItems;
}
struct MyRecord
{
    0: int32 field1;
    1: int32 field2;
    0: bonded<DeserializeOnDemand> myLongList;
}
```

Figure 3:
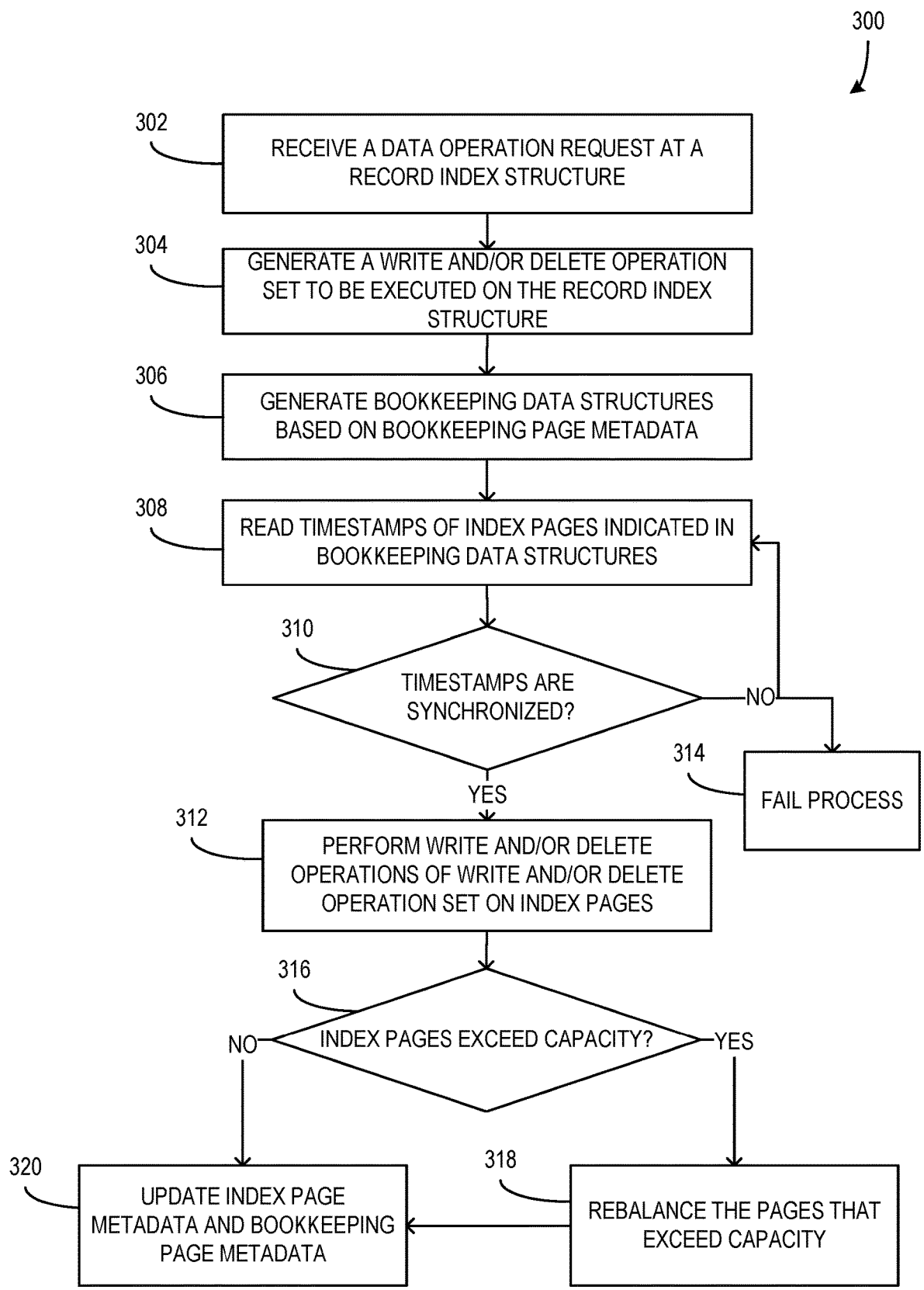
FIG. 3 is a flowchart illustrating a method for processing a data operation request including write and/or delete operations in a record index structure.

FIG. 3 is a flowchart illustrating a method 300 for processing a data operation request 115 including write and/or delete operations (e.g., storage function 109, update function 112, deletion function 113) in a record index structure 107. In some examples, the method 300 is executed or otherwise performed by a server 101 of a system 100 of FIG. 1. At 302, a data operation request is received at a record index structure. In some examples, the data operation request includes key data and/or parameter data indicative of the details of the request(s) to be fulfilled. The key data includes an identifier of a bookkeeping page of the record index structure (e.g., a first bookkeeping page if there are multiple bookkeeping pages in the record index structure) and that key data is used by the system to identify the record index structure being targeted by the request.

At 304, a write and/or delete operation set is generated that includes operations to be executed on the record index structure. In some examples, the write and/or delete operation set includes each write or delete operation to be performed and a map of each of the operations to the index that the operations are targeting. In such examples, the request includes requested operations on multiple record index structures, though in other examples, the requested operations only target a single record index structure as described herein with respect to FIG. 3. It should be understood that the method 300 is performed for each index targeted by a request without departing from the description.

Further, upon the generation of the operation set, in some examples, a Large Index Manager (LIM) instance is created. The LIM instance is a process configured to manage states and implement behaviors in the record index structure as a whole (e.g., reading a consistent "snapshot" of pages of the index when processing a request, as described below). In some examples where the request targets multiple indexes, a separate LIM instance is created and operated for each index.

At 306, the bookkeeping page of the record index structure is read, and bookkeeping data structures associated with the operations are generated based on bookkeeping page metadata (e.g., page metadata 220 and/or index-entry page map 230). In some examples, for each operation in the write and/or delete operation set, the page or pages of the record index structure that are to be affected by the operation are determined using the bookkeeping page metadata. The generated bookkeeping data structures are configured to include the operations to be performed and the associated pages upon which those operations are to be performed.

At 308, timestamps of the pages in the bookkeeping data structures (e.g., timestamps 236 of index pages 218) are read and the corresponding timestamps in the bookkeeping page metadata (e.g., timestamps 224 of page metadata 220) are read. At 310, if the timestamps of the pages are synchronized or otherwise match with the corresponding timestamps in the bookkeeping page metadata, the process proceeds to 312. Alternatively, if the timestamps are not synchronized, the process returns to 308 to try again or proceeds to 314 where the process fails. In some examples, the method 300 is configured to return to 308 to retry timestamp verification at 310 a defined quantity of times before proceeding to 314 to fail the process. In some examples where the process fails at 314, a notification is provided to the source of the data operation request to inform the source that the process has failed and/or to provide a reason for its failure.

At 312, the write and/or delete operations of the write and/or delete operation set are performed on the index pages indicated in the generated bookkeeping data structures. In some examples, for each index page affected by an operation, a Large Index Page Manager (LIPM) instance is created. The LIPM instance is configured to manage the states and implement behaviors of an index page, including adding index entries, removing index entries, determining location of index entries, or the like within the index page. Further, LIPM instances are configured to detect and enable rebalancing of index pages when they grow beyond set limits or otherwise become too large. In such examples, the LIPM instances communicate with the LIM instance to enable the LIM instance to keep the index-level bookkeeping data structures, such as the page metadata 220, up to date.

Further, in some examples, for each delete operation, the LIPM instance removes the targeted index entry from the set of index entries stored in the index page targeted by the operation. For each write operation, the LIPM instance inserts or otherwise adds the new index entry to the set of index entries stored in the index page targeted by the operation. Adding a new index entry to an index page includes adding the new index entry to the index page in a location based on the sort value of the new index entry. For example, a new index entry with a sort value of X is added to an existing group of index entries with sort values of X, after a last index entry with a sort value of X−1, or before a first index entry with a sort value of X+1.

Additionally, in examples where the operations include an update operation (e.g., an index entry is to be moved from one location to another), the LIPM instance(s) of the page or pages affected by the update operation are configured to perform a delete operation targeted at the location where the index entry is currently stored, and a write operation targeted at the location where the index entry is to be stored after the update. In some examples, the delete operation is performed prior to the write operation, but in other examples, other orders are used without departing from the description.

When the operations are performed at 312, if affected index pages exceed capacity at 316, the process proceeds to 318 to rebalance those pages that exceed capacity. Alternatively, if no pages exceed capacity, the process proceeds to 320 to update the index page metadata and the bookkeeping page metadata because of changes made during the performance of the operations (and changes made during rebalancing of pages at 318 if such operations occurred).

In some examples, the capacity limit of index pages is defined for the record index structure. In an example, the capacity limit of all index pages is set to 50% of a hard capacity limit of the page data structure. Such a percentage limit enables the system to maintain the index pages with flexibility. At 318, to rebalance a page that exceeds such a defined capacity, a quantity of index entries that would fill the page to the capacity limit is calculated. A new index page is created, and that quantity of index entries is moved to the new page. In such examples, the index entries to be moved are moved from the end of the sorted list of entries of the page being rebalanced or from the beginning of the sorted list of entries of the page being rebalanced. However, if the set of index entries to be moved results in a group of index entries having identical sort values being split between two pages, the set of index entries to be moved is increased or decreased in size to avoid splitting up the group of index entries having identical sort values. Further, in some examples, multiple new index pages are created to enable rebalancing without departing from the description.

Alternatively, or additionally, in some examples, the record index structure is configured to enable multiple index pages 218 to include index entries with the same sort values. In such examples, if multiple index pages 218 have overlapping sort value ranges, adding an index entry with a sort value in the overlapping sort value range includes appending the index entry to the index page 218 with the highest identifier value. In other examples, other methods of selecting from multiple index pages 218 are used without departing from the description.

Further, in some examples, in addition to rebalancing index pages as described herein, the method 300 and/or the associated system is configured to implement defragmentation operations when pages shrink in size (e.g., the quantity of index entries stored in a page is reduced due to rebalancing and/or index entries being deleted based on a data expiration process).

At 320, the index page metadata and bookkeeping page metadata are updated to reflect the changes made during the method 300. In some examples, such updates include the timestamps 236, sort value ranges 238, and/or entry quantities 240 of the index pages 218 changed and the corresponding timestamps 224, sort value ranges 226, and entry quantities 228 of the page metadata 220 stored in the bookkeeping pages 216. Further, any new index pages created during rebalancing are updated to include accurate metadata values of timestamp, sort value range, and entry quantity and the bookkeeping page metadata is updated to reflect the metadata of the new index pages as well.

In some examples, when the method 300 is complete after 320, the full set of pages of the record index structure are written from memory to an underlying data store. In some examples, writing the data of the record index structure to the underlying data store is done using Compare and Set (CAS) semantics. In cases of failures during such operations, the operations are retried until they succeed or a maximum number of retries occurs and the request is failed in its totality.

Further, in examples where the request being processed targets multiple indexes and the request is to be performed iteratively, the method 300 is performed iteratively for each other index targeted by the request.

In some examples, the operations of the systems and methods described herein are adjusted and/or improved using machine learning techniques. For instance, models are trained using machine learning techniques to optimize a rebalancing threshold to be used for each index type, to optimize the use of parallel batch processing, and/or to optimize page size to be used in each index.

In examples where a rebalancing threshold is optimized using a trained model, distribution of data entries throughout the pages of existing indexes of an index type and/or flow of data into and out of the indexes are recorded for use as training data. A threshold selection model is trained using the training data to optimize resources (e.g., processing resources, memory resources, and/or data storage resources) used in rebalancing operations over time. In some such examples, the model is trained for use with a specific index type. Additionally, or alternatively, the model is trained to prioritize data distribution states of the index based on flow of data into and out of the indexes of the training data. For instance, if an index type tends to have large quantities of data received in short periods of time, the model is trained to prioritize maintaining more index pages and a large data capacity to reduce the need for rebalancing as the large quantities of data are being received. Alternatively, if an index type tends to have a relatively smaller quantities of data received consistently over time, the model is trained to prioritize maintaining fewer index pages with a smaller data capacity to make more efficient use of the existing index pages rather than creating many index pages that will not be fully used. Further, in some examples, the model is trained to adjust the rebalancing threshold of an index based on changes in the state of the index over time (e.g., the model is trained to predict that a large quantity of data is likely to be received soon and to adjust the rebalancing threshold down to cause preemptive rebalancing prior to receiving the predicted data).

In examples where the use of parallel batch processing is optimized, data distribution, performance, and resource usage associated with indexes is recorded as training data. A model is trained using the training data to select when to perform operations in parallel and/or iteratively to optimize the use of system resources and/or time taken to complete operations. Further, the trained model is trained and/or tuned to prioritize the use of resources based on detected states of the index. For instance, if the queue of operations to be performed on the index is growing or an average queued time of operations is increasing or reaches a defined threshold, the model is trained to switch to performing more operations in parallel, consuming more resources but completing operations more quickly. Alternatively, if the queue of operation to be performed on the index is reducing or an average queued time of operations is decreasing or falls beneath a defined threshold, the model is trained to switch to performing more operations iteratively such that the resources of the system are used more efficiently at the expense of the operation completion rate.

In examples where page size of an index is optimized, data distribution and data flow in to and out of the index are recorded as training data. A model is trained to optimize the use of resources and/or performance of operations in the index through page size selection. Training the model includes the model selecting a page size for the index, simulating the operations described in the training data in the index with the selected page size, recording performance and resource usage metrics, and adjusting the model based on the recorded performance and resource usage metrics. In some examples, the model is trained to prioritize defined states of performance and/or resource usage for specific indexes or index types.

Figure 4:
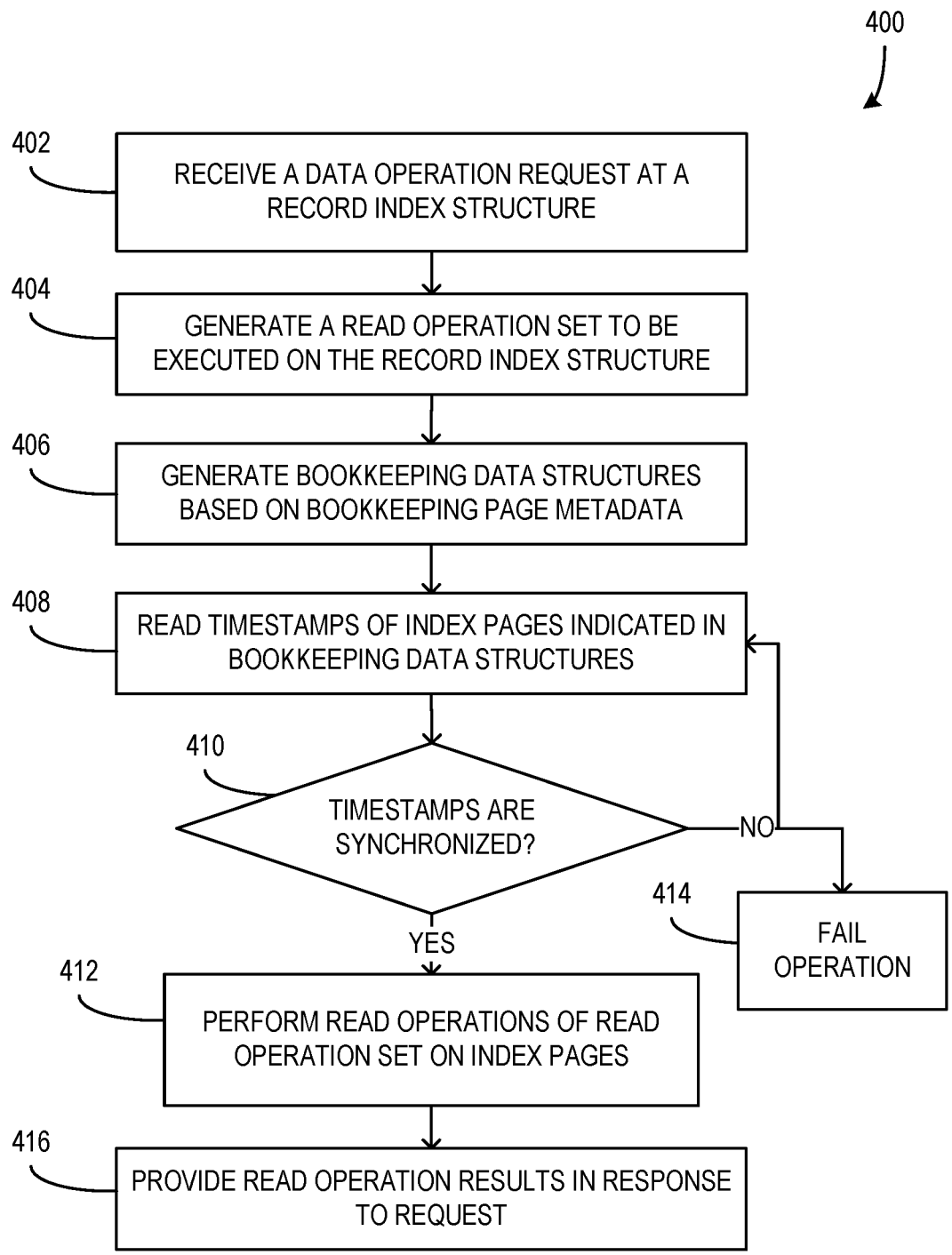
FIG. 4 is a flowchart illustrating a method for processing a data operation request including index entry read operations in a record index structure.

FIG. 4 is a flowchart illustrating a method 400 for processing a data operation request 115 including index entry read operations (e.g., search functions 110 and/or retrieval functions 111) in a record index structure 107. In some examples, the method 400 is executed or otherwise performed by a server 101 of a system 100 of FIG. 1. At 402, a data operation request is received at a record index structure. In some examples, the reception of the data operation request occurs in substantially the same way as described above with respect to 302 of method 300 of FIG. 3.

At 404, a read operation set is generated that includes one or more read operations to be executed on the record index structure. In some examples, the read operation set includes each read operation to be performed and a map of each of the operations to the index that the operations are targeting. In such examples, the request includes requested operations on multiple record index structures, though in other examples, the requested operations only target a single record index structure as described herein with respect to FIG. 4. It should be understood that the method 400 is performed for each index targeted by a request without departing from the description.

Further, in some examples, the method 400 uses LIM instances and/or LIPM instances as described above with respect to method 300 of FIG. 3.

At 406, bookkeeping data structures are generated based on bookkeeping page metadata (e.g., page metadata 220 and/or index entry-page map 230). In some examples, for each operation in the read operation set, the page or pages of the record index structure that are to be accessed by the operation are determined using the bookkeeping page metadata. The generated bookkeeping data structures are configured to include the operations to be performed and the associated pages upon which those operations are to be performed. For instance, in an example, a read operation of the read operation set is configured to read an index entry that is identified in the operation by its index entry ID 244. A generated bookkeeping data structure includes the read operation and/or a reference to the read operation and an associated page (e.g., index page 218 or bookkeeping page 216) on which the index entry to be read is located. The location of the index entry is determined using the index entry-page map 230 of the bookkeeping page 216, which maps index entry IDs to page IDs of pages upon which those index entries are stored.

At 408, timestamps of the pages in the bookkeeping data structures (e.g., timestamps 236 of index pages 218) are read and the corresponding timestamps in the bookkeeping page metadata (e.g., timestamps 224 of page metadata 220) are read. At 410, if the timestamps of the pages are synchronized or otherwise match with the corresponding timestamps in the bookkeeping page metadata, the process proceeds to 412. Alternatively, if the timestamps are not synchronized, the process returns to 408 to try again or proceeds to 414 where the process fails. In some examples, the method 400 is configured to return to 408 to retry timestamp verification at 410 a defined quantity of times before proceeding to 414 to fail the process. In some examples where the process fails at 414, a notification is provided to the source of the data operation request to inform the source that the process has failed and/or to provide a reason for its failure.

At 412, the read operations of the read operation set are performed on the index pages indicated in the generated bookkeeping data structures. In some examples, performance of the read operations includes LIPM instances being created for each page being read and those LIPM instances accessing the index entries that are targeted by the read operations and returning data therefrom as results or result data. For instance, a read operation that targets an index entry on an index page results in an LIPM instance being created for that page. The LIPM uses the target index entry ID in the read operation to locate the target index entry on the page (e.g., comparing the target index entry ID to the ID of each index entry until a match is found). The LIPM then retrieves the requested data from the target index entry (e.g., a portion or all of the record data 248 of the target index entry).

At 416, the results of the performed read operations are provided in response to the request. In some examples, each LIPM instance that performed a read operation and obtained a result provides the result to an LIM instance of the index, where the results are aggregated or otherwise combined into a result data structure. The result data structure is then provided to the source of the data operation request in response to that request. It should be understood that, because pure read operations do not change the data stored in the pages of the record index structure, the method 400 does not include updating of the metadata of the affected pages or the page metadata of the bookkeeping page(s) thereof. Alternatively, in other examples where the data operation request includes read operations as well as write or delete operations, the method includes the update and maintenance of the metadata of index pages and page metadata of bookkeeping pages as described above with respect to FIG. 3.

Figure 5:
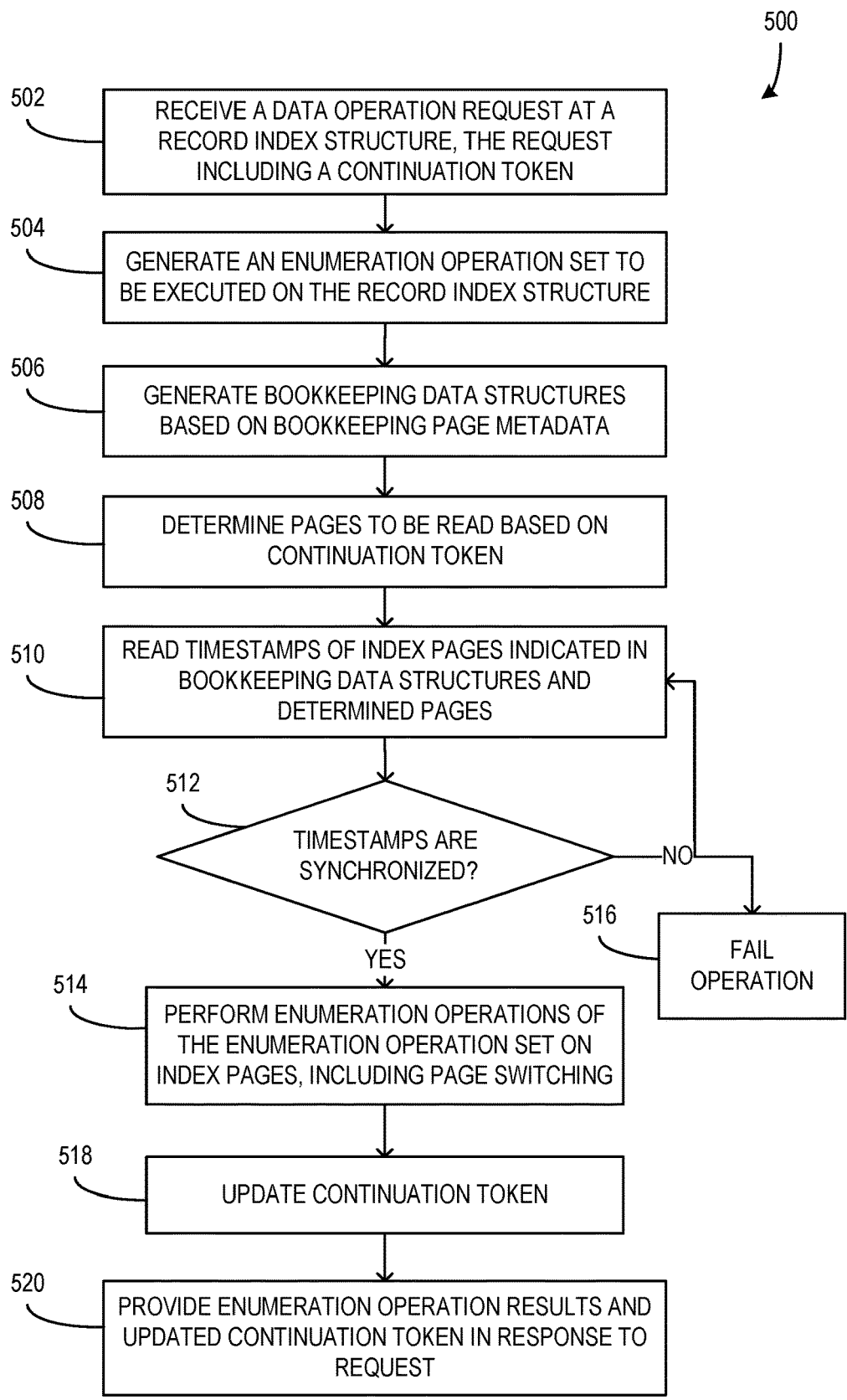
FIG. 5 is a flowchart illustrating a method for processing a data operation request including enumeration operations in a record index structure.

FIG. 5 is a flowchart illustrating a method 500 for processing a data operation request 115 including enumeration operations (e.g., search functions 110 and/or retrieval functions 111 that require large quantities of reads and/or results) in a record index structure 107. In some examples, the method 500 is executed or otherwise performed by a server 101 of a system 100 of FIG. 1. At 502, a data operation request is received at a record index structure. In some examples, the reception of the data operation request occurs in substantially the same way as described above with respect to 302 of method 300 of FIG. 3.

Further, in some examples, the request includes a continuation token. The continuation token is configured to store the current state of an enumerated function that is partially completed (e.g., a record of how far the enumerated function has progressed and/or a starting point for the next stage of the enumerated function). For instance, if an enumeration operation includes obtaining data from a large quantity of index entries, such that the operation is broken into several batches of index entries, the continuation token is configured to include information that is used by the method 500 to begin accessing index entries that have not been accessed yet by previous iterations of the function. Further, in some examples, the continuation token includes data indicating the quantity of index entries to be accessed during each iteration. For example, a continuation token includes an entry ID of the last index entry accessed in the previous iteration and an entry quantity of 5000 indicating that 5000 index entries should be accessed for this iteration. Additionally, or alternatively, the continuation token includes a timestamp that is used to determine whether the enumeration can be guaranteed to be complete (e.g., that all entries will be enumerated). This guarantee cannot be given if the index is updated while the enumeration is ongoing. Further, in some examples, the continuation token includes a status field that indicates whether the enumeration is consistent and/or whether it is beginning, ongoing, or complete.

At 504, an enumeration operation set is generated that includes one or more enumeration operations to be executed on the record index structure. In some examples, the enumeration operation set includes each enumeration operation to be performed and a map of each of the operations to the index that the operations are targeting. In such examples, the request includes requested operations on multiple record index structures, though in other examples, the requested operations only target a single record index structure as described herein with respect to FIG. 5. It should be understood that the method 500 is performed for each index targeted by a request without departing from the description.

Further, in some examples, the method 500 uses LIM instances and/or LIPM instances as described above with respect to method 300 of FIG. 3.

At 506, bookkeeping data structures are generated based on bookkeeping page metadata (e.g., page metadata 220 and/or index entry-page map 230). In some examples, for each operation in the enumeration operation set, the page or pages of the record index structure that are to be accessed or affected by the operation are determined using the bookkeeping page metadata. The generated bookkeeping data structures are configured to include the operations to be performed and the associated pages upon which those operations are to be performed. In an example, an enumeration operation of the enumeration operation set is configured to read a set of index entries that are identified in the operation by a plurality of sort values 246. A generated bookkeeping data structure includes the enumeration operation and/or a reference to the enumeration operation and an associated plurality of pages (e.g., index pages 218 or bookkeeping pages 216) on which the index entries to be read are located. The locations of the index entries are determined using the sort value ranges 226 of the page metadata 220 of the bookkeeping page 216.

At 508, the pages to be read are determined based on the continuation token. In some examples, the request indicates that the enumeration operations are ongoing based on data of the continuation token. Further, in some examples, the quantity of entries and/or pages that are affected by the enumeration operations on this iteration are limited based on an included entry quantity in the continuation token. Based on these factors, the method 500 determines a starting point for this iteration of the enumeration operations and a set of pages that are to be accessed and/or affected by this iteration of the enumeration operations. The generated bookkeeping data structures are updated based on the pages that are determined to be read at 508.

At 510, timestamps of the pages in the bookkeeping data structures (e.g., timestamps 236 of index pages 218) are read and the corresponding timestamps in the bookkeeping page metadata (e.g., timestamps 224 of page metadata 220) are read. At 512, if the timestamps of the pages are synchronized or otherwise match with the corresponding timestamps in the bookkeeping page metadata, the process proceeds to 514. Alternatively, if the timestamps are not synchronized, the process returns to 510 to try again or proceeds to 516 where the process fails. In some examples, the method 500 is configured to return to 510 to retry timestamp verification at 512 a defined quantity of times before proceeding to 516 to fail the process. In some examples where the process fails at 516, a notification is provided to the source of the data operation request to inform the source that the process has failed and/or to provide a reason for its failure.

At 514, the enumeration operations of the enumeration operation set are performed on the index pages indicated in the bookkeeping data structures. In some examples, performing an enumeration operation includes switching between pages during the performance of the operation. In some examples, performing an enumeration operation includes identifying a current offset into an index page based on a starting point indicated in the continuation token. In some examples, the starting point is indicated using a sort value and an index entry ID. If one or more index entries with the sort value indicated in the continuation token exist, the method 500 locates the last index entry with that sort value and searches backward through the index entries with that sort value to identify an index entry with an index entry ID that matches an indicator in the continuation token. If no such entry is found, the enumeration operation is started from the first index entry with a matching sort value.

From the starting point, the method 500 accesses index entries in order (e.g., adding the entries and/or some data thereof to a set of data to be returned by the operation). Index entries are accessed until the quantity limit for the iteration of the enumeration operation is met or the enumeration operation is completed. In some examples, during performance of such an operation, an end of a page is reached. In such examples, a next page is accessed based on the pages identified previously and included in the bookkeeping data structures (e.g., a next page based on sort value ranges 238 of the index pages 218).

At 518, after the enumeration operations are performed, the continuation token is updated. In some examples, updating the continuation token includes updating its timestamp to coincide with a timestamp of the bookkeeping page 216 when the operations were completed and/or updating its state metadata to indicate a starting point for operations during the next iteration (e.g., setting starting point information based on the last index entry accessed and/or an associated sort value of the last index entry).

At 520, the enumeration operation results and updated continuation token are provided in response to the request. In some examples, if the enumeration results caused any changes to the index pages and/or bookkeeping pages of the record index structure, the method 500 includes updating the metadata of those pages as described above with respect to FIG. 3.

Additionally, or alternatively, it should be understood that, in some examples, data operation requests include requests for operations of a variety of different types (e.g., a request that includes write operations followed by enumeration operations to read a large quantity of associated data). In such examples, the performance of methods 300, 400, 500, and/or other similar methods are combined to process such requests without departing from the description.

Figure 6:
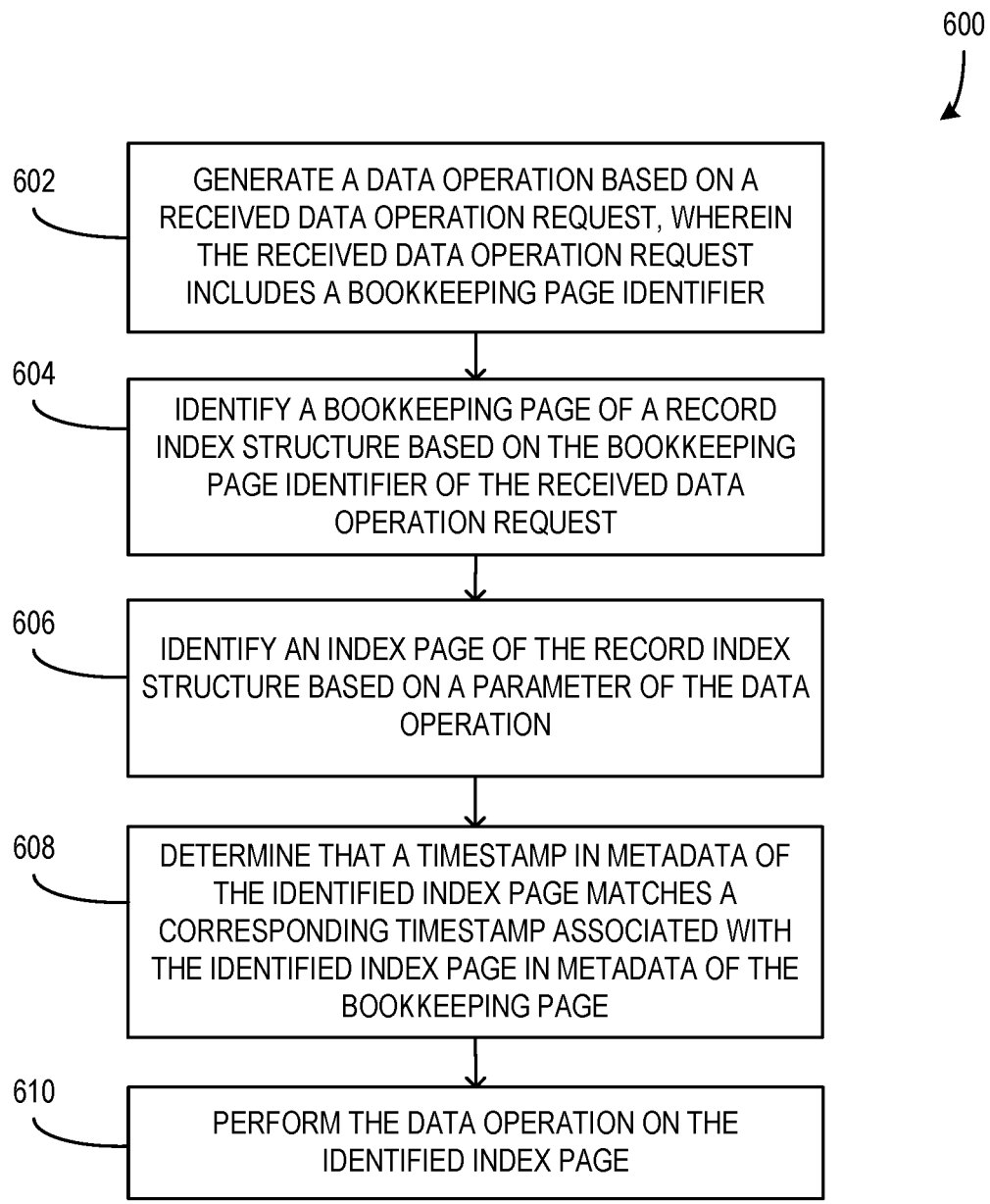
FIG. 6 is a flowchart illustrating a method for processing a data operation request in a record index structure.

FIG. 6 is a flowchart illustrating a method 600 for processing a data operation request (e.g., data operation request 115) in a record index structure (e.g., record index structure 107). In some examples, the method 600 is executed or otherwise performed by a server 101 or components thereof in a system 100 as described herein with respect to FIG. 1. At 602, a data operation is generated based on a received data operation request, wherein the received data operation request includes a bookkeeping page identifier. In some examples, the data operation is one of a read operation, a write operation, a delete operation, an enumeration operation, or the like. Further, in some examples, a plurality of data operations are generated based on the received data operation request, wherein the plurality of data operations include data operations that target different index entries of the record data structure and/or data operations of different types (e.g., some read operations and some write operations).

At 604, a bookkeeping page of a record index structure is identified based on the bookkeeping page identifier of the received data operation request.

At 606, an index page of the record index structure is identified based on a parameter of the data operation. In some examples, the index page is identified based on a target index entry identifier of the data operation and an index entry-page map of the identified bookkeeping page, which yields an index page identifier. Additionally, or alternatively, the index page is identified based on a target sort value of the data operation and the page-specific metadata stored in the bookkeeping page, which includes sort value ranges of each index page of the record index structure. Further, in some examples, multiple index pages are identified based on the data operation(s) associated with the request without departing from the description.

At 608, it is determined that a timestamp in metadata of the identified index page matches a corresponding timestamp associated with the identified index page in metadata of the bookkeeping page. In some examples, if it is determined that the timestamp and corresponding timestamp do not match, the process waits and/or retries to access the timestamps until they match or a retry limit is reached (e.g., a limit to the number of retries and/or a limit to the quantity of time spent retrying). If the retry limit is reached, the method 600 fails and a notification of the process failure is provided to the source of the data operation request.

At 610, the data operation is performed on the identified index page. In some examples, performing the data operation includes reading data from one or more index entries, writing one or more index entries to the identified index page, deleting one or more index entries from the identified index page, or the like. In some examples, updating an index entry includes deleting the index entry in one location and writing the updated index entry to another location, as described herein.

Further, in some examples where the performance of the data operation changes data in the index page (e.g., writing data or deleting data), the metadata of the index page and the corresponding metadata in the bookkeeping page are updated to reflect the changes caused by the data operation. For instance, when a new index entry is written to an index page, the timestamp of the index page is updated to a current time associated with performance of the operation and the index entry count value is increased to reflect the addition of the new index entry. Additionally, if the new index entry has a sort value that is not included in the sort value range of the index page, the sort value range of the index page is updated to include the sort value of the new index entry. Similarly, the page metadata (e.g., page metadata 220) associated with the index page and stored on the bookkeeping page is updated in the same manner.

Additionally, in some examples, after the index page is changed, it is determined that the index page should be rebalanced. In such examples, the index entries of the index page are rebalanced to other pages as described above at least with respect to FIG. 3.

In some examples, the described large index structures can enter a live-lock situation if the quantity of entries requested per iteration of an enumeration operation is smaller than the quantity of consecutive entries with identical sort values and the last enumerated index entry is consistently deleted in between iterations. In such examples, this issue is alleviated by configuring the continuation token to include a bloom filter of already-enumerated index entries for the current sort value such that the bloom filter enables the first index entry guaranteed to not yet have been enumerated to be located.

Exemplary Operating Environment

Figure 7:
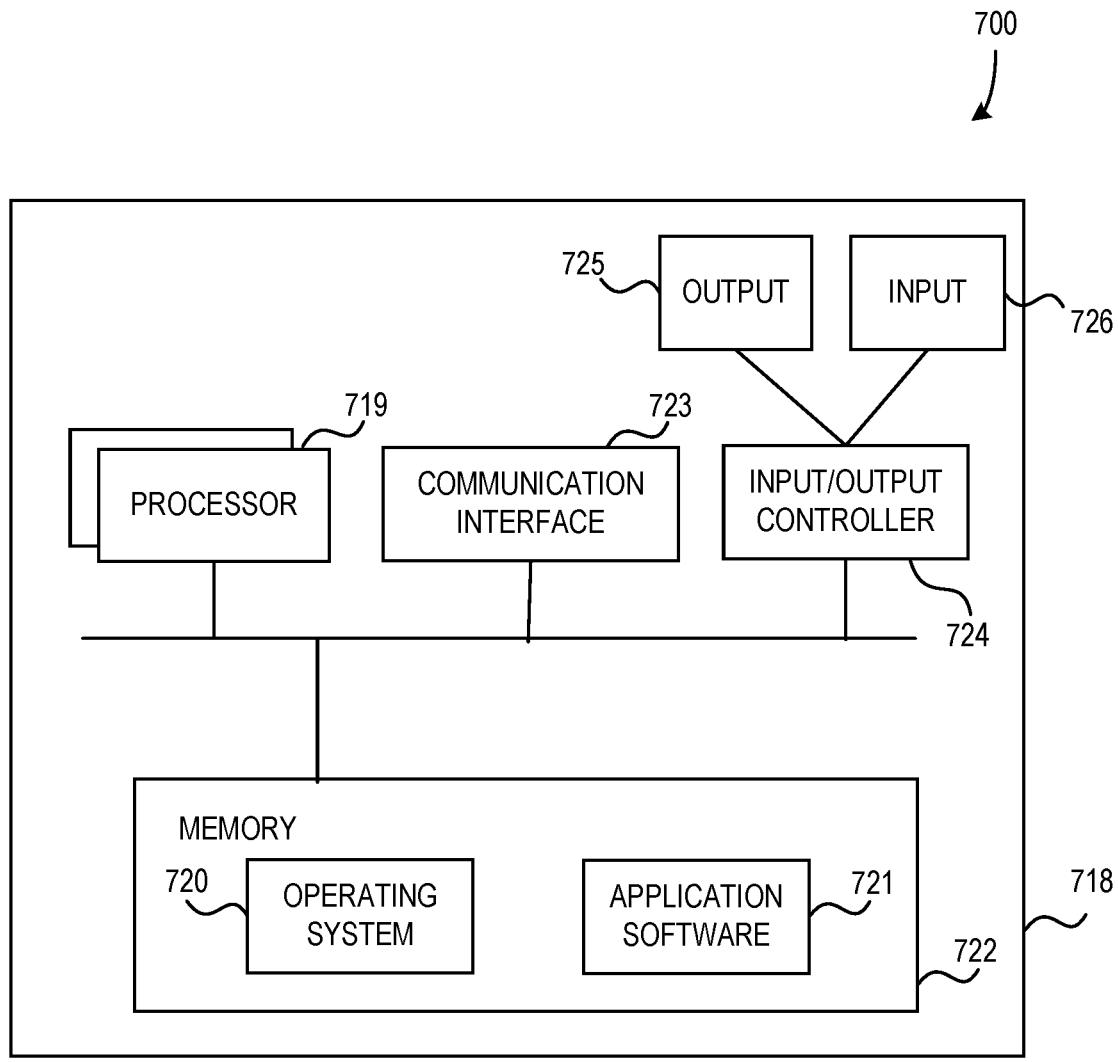
FIG. 7 illustrates an example computing apparatus as a functional block diagram.

The present disclosure is operable with a computing apparatus according to an embodiment as a functional block diagram 700 in FIG. 7. In an example, components of a computing apparatus 718 are implemented as a part of an electronic device according to one or more embodiments described in this specification. The computing apparatus 718 comprises one or more processors 719 which may be microprocessors, controllers, or any other suitable type of processors for processing computer executable instructions to control the operation of the electronic device. Alternatively, or in addition, the processor 719 is any technology capable of executing logic or instructions, such as a hard-coded machine. In some examples, platform software comprising an operating system 720 or any other suitable platform software is provided on the apparatus 718 to enable application software 721 to be executed on the device. In some examples, the processing of data operation requests and managing of large index structures as described herein is accomplished by software, hardware, and/or firmware.

In some examples, computer executable instructions are provided using any computer-readable media that are accessible by the computing apparatus 718. Computer-readable media include, for example, computer storage media such as a memory 722 and communications media. Computer storage media, such as a memory 722, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 722) is shown within the computing apparatus 718, it will be appreciated by a person skilled in the art, that, in some examples, the storage is distributed or located remotely and accessed via a network or other communication link (e.g., using a communication interface 723).

Further, in some examples, the computing apparatus 718 comprises an input/output controller 724 configured to output information to one or more output devices 725, for example a display or a speaker, which are separate from or integral to the electronic device. Additionally, or alternatively, the input/output controller 724 is configured to receive and process an input from one or more input devices 726, for example, a keyboard, a microphone, or a touchpad. In one example, the output device 725 also acts as the input device. An example of such a device is a touch sensitive display. The input/output controller 724 may also output data to devices other than the output device, e.g., a locally connected printing device. In some examples, a user provides input to the input device(s) 726 and/or receive output from the output device(s) 725.

The functionality described herein can be performed, at least in part, by one or more hardware logic components. According to an embodiment, the computing apparatus 718 is configured by the program code when executed by the processor 719 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises: at least one processor; and at least one memory comprising computer program code, the at least one memory and the computer program code configured to, with the at least one processor, cause the at least one processor to: generate a data operation based on a received data operation request, wherein the received data operation request includes a bookkeeping page identifier; identify a bookkeeping page of a record index structure based on the bookkeeping page identifier of the received data operation request; identify an index page of the record index structure based on a parameter of the data operation; determine that a timestamp in metadata of the identified index page matches a corresponding timestamp associated with the identified index page in metadata of the bookkeeping page; and perform the data operation on the identified index page.

An example computerized method comprises: generating, by a processor, a data operation based on a received data operation request, wherein the received data operation request includes a bookkeeping page identifier; identifying, by the processor, a bookkeeping page of a record index structure based on the bookkeeping page identifier of the received data operation request; identifying, by the processor, an index page of the record index structure with a parameter of the data operation; determining, by the processor, that a timestamp in metadata of the identified index page matches a corresponding timestamp associated with the identified index page in metadata of the bookkeeping page; and performing, by the processor, the data operation on the identified index page.

One or more computer storage media have computer-executable instructions that, upon execution by a processor, cause the processor to at least: generate a data operation based on a received data operation request, wherein the received data operation request includes a bookkeeping page identifier; identify a bookkeeping page of a record index structure based on the bookkeeping page identifier of the received data operation request; identify an index page of the record index structure with a parameter of the data operation; determine that a timestamp in metadata of the identified index page matches a corresponding timestamp associated with the identified index page in metadata of the bookkeeping page; and perform the data operation on the identified index page.

Alternatively, or in addition to the other examples described herein, examples include any combination of the following:

wherein the generated data operation is a read operation; wherein received data operation request includes an index entry identifier associated with a target index entry to be read; wherein identifying the index page includes identifying an index page identifier of the index page using the index entry identifier and an index entry-page map of the identified bookkeeping page; wherein performing the data operation includes accessing the target index entry on the identified index page and obtaining data from the target index entry; and wherein the computerized method further comprises providing the obtained data in response to the received data operation request.

wherein the generated data operation is write operation; wherein the received data operation request includes data of an index entry to be written, the data including a sort value of the index entry; wherein identifying the index page includes identifying an index page identifier of the index page using the sort value of the index entry to be written and sort value ranges of index pages of the record index structure stored as metadata in the bookkeeping page; wherein performing the data operation includes recording the index entry to the identified index page in an order based on the sort value of the index entry relative to sort values of other index entries in the identified index page; and wherein the computerized method further comprises: updating metadata of the identified index page, wherein the updated metadata of the identified index page includes at least one of the following: the timestamp, a sort value range, and an index entry count value; and updating metadata of the bookkeeping page associated with the identified index page to match the updated metadata of the identified index page.

further comprising: based on a quantity of index entries stored on the identified index page exceeding a capacity limit, rebalancing the index entries stored on the identified index page, wherein rebalancing the index entries includes: determining a quantity of index entries that would fill the identified index page to the capacity limit; creating a new index page in the record index structure; moving the quantity of index entries from the identified index page to the new index page; and updating metadata of the identified index page, the new index page, and corresponding metadata on the bookkeeping page based on moving the quantity of index entries.

wherein the generated data operation is an enumeration operation; wherein the received data operation request includes query parameters for accessing a plurality of index entries; wherein the received data operation request includes a continuation token associated with an ongoing enumeration operation; wherein identifying the index page includes identifying an index page identifier based on the query parameters and identifying a starting index entry based on the continuation token; wherein performing the data operation includes obtaining data from a quantity of index entries in order starting with the starting index entry, wherein the quantity of index entries is based on the continuation token; and wherein the computerized method further comprises providing the obtained data from the quantity of index entries and an updated continuation token in response to the received data operation request.

further comprising: determining that the timestamp in metadata of the identified index page does not match the corresponding timestamp associated with the identified index page in metadata of the bookkeeping page; based on determining the timestamp and corresponding timestamp do not match, performing one of the following: accessing and compare the timestamp and the corresponding timestamp again; and responding to the received data operation request with a notification indicating a response to the received data operation request cannot be completed.

wherein the received data operation request includes another data operation directed to another record index structure and an indicator indicating the operations are to be performed iteratively; and wherein the computerized method further comprises initiating performance of the other data operation on the other record index structure based on completion of the performance of the data operation.

wherein a plurality of data operations targeted at a plurality of index pages of the record index structure are generated based on the received data operation request; and wherein the computerized method further comprises: generating a Large Index Page Manager (LIPM) instance for each index page of the plurality of index pages; and performing the plurality of data operations on the plurality of index pages in parallel using the LIPM instances of the plurality of index pages.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for generating, by a processor, a data operation based on a received data operation request, wherein the received data operation request includes a bookkeeping page identifier; exemplary means for identifying, by the processor, a bookkeeping page of a record index structure based on the bookkeeping page identifier of the received data operation request; exemplary means for identifying, by the processor, an index page of the record index structure with a parameter of the data operation; exemplary means for determining, by the processor, that a timestamp in metadata of the identified index page matches a corresponding timestamp associated with the identified index page in metadata of the bookkeeping page; and exemplary means for performing, by the processor, the data operation on the identified index page.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
a processor; and
a memory comprising computer program code, the memory and the computer program code configured to, with the processor, cause the processor to:
generate a data operation based on a received data operation request, wherein the received data operation request includes a bookkeeping page identifier;
identify a bookkeeping page of a record index structure based on the bookkeeping page identifier;
identify an index page of the record index structure based on a parameter of the data operation;
determine that a timestamp in metadata of the identified index page matches a corresponding timestamp associated with the identified index page in metadata of the bookkeeping page; and
perform the data operation on the identified index page.

2. The system of claim 1, wherein the generated data operation is a read operation;
wherein the received data operation request includes an index entry identifier associated with a target index entry to be read;
wherein identifying the index page includes identifying an index page identifier of the index page using the index entry identifier and an index entry-page map of the identified bookkeeping page;
wherein performing the data operation includes accessing the target index entry on the identified index page and obtaining data from the target index entry; and
wherein the memory and the computer program code are configured to, with the processor, further cause the processor to provide the obtained data in response to the received data operation request.

3. The system of claim 1, wherein the generated data operation is a write operation;
wherein received data operation request includes data of an index entry to be written, the data including a sort value of the index entry;
wherein identifying the index page includes identifying an index page identifier of the index page using the sort value of the index entry to be written and sort value ranges of index pages of the record index structure stored as metadata in the bookkeeping page;
wherein performing the data operation includes recording the index entry to the identified index page in an order based on the sort value of the index entry relative to sort values of other index entries in the identified index page; and
wherein the memory and the computer program code are configured to, with the processor, further cause the processor to:
update metadata of the identified index page, wherein the updated metadata of the identified index page includes at least one of the following: the timestamp, a sort value range, and an index entry count value; and
update metadata of the bookkeeping page associated with the identified index page to match the updated metadata of the identified index page.

4. The system of claim 3, wherein the memory and the computer program code are configured to, with the processor, further cause the processor to:
based on a quantity of index entries stored on the identified index page exceeding a capacity limit, rebalance the index entries stored on the identified index page, wherein rebalancing the index entries includes:

determining a quantity of index entries that would fill the identified index page to the capacity limit;
creating a new index page in the record index structure; and
moving the quantity of index entries from the identified index page to the new index page; and
updating metadata of the identified index page, the new index page, and corresponding metadata on the bookkeeping page based on moving the quantity of index entries.

5. The system of claim 1, wherein the generated data operation is an enumeration operation;
wherein received data operation request includes query parameters for accessing a plurality of index entries;
wherein the received data operation request includes a continuation token associated with an ongoing enumeration operation;
wherein identifying the index page includes identifying an index page identifier based on the query parameters and identifying a starting index entry based on the continuation token;
wherein performing the data operation includes obtaining data from a quantity of index entries in order starting with the starting index entry, wherein the quantity of index entries is based on the continuation token; and
wherein the memory and the computer program code are configured to, with the processor, further cause the processor to provide the obtained data from the quantity of index entries and an updated continuation token in response to the received data operation request.

6. The system of claim 1, wherein the memory and the computer program code are configured to, with the processor, further cause the processor to:
determine that the timestamp in metadata of the identified index page does not match the corresponding timestamp associated with the identified index page in metadata of the bookkeeping page;
based on determining that the timestamp and corresponding timestamp do not match, perform one of the following:
access and compare the timestamp and the corresponding timestamp again; and
respond to the received data operation request with a notification indicating a response to the received data operation request cannot be completed.

7. The system of claim 1, wherein the received data operation request includes another data operation directed to another record index structure and an indicator indicating the operations are to be performed iteratively; and
wherein the memory and the computer program code are configured to, with the processor, further cause the processor to initiate performance of the other data operation on the other record index structure based on completion of the performance of the data operation.

8. The system of claim 1, wherein a plurality of data operations targeted at a plurality of index pages of the record index structure are generated based on the received data operation request; and
wherein the memory and the computer program code are configured to, with the processor, further cause the processor to:
generate a Large Index Page Manager (LIPM) instance for each index page of the plurality of index pages; and
perform the plurality of data operations on the plurality of index pages in parallel using the LIPM instances of the plurality of index pages.

9. A computerized method comprising:
generating, by a processor, a data operation based on a received data operation request, wherein the received data operation request includes a bookkeeping page identifier;
identifying, by the processor, a bookkeeping page of a record index structure based on the bookkeeping page identifier;
identifying, by the processor, an index page of the record index structure with a parameter of the data operation;
determining, by the processor, that a timestamp in metadata of the identified index page matches a corresponding timestamp associated with the identified index page in metadata of the bookkeeping page; and
performing, by the processor, the data operation on the identified index page.

10. The computerized method of claim 9, wherein the generated data operation is a read operation;
wherein received data operation request includes an index entry identifier associated with a target index entry to be read;
wherein identifying the index page includes identifying an index page identifier of the index page using the index entry identifier and an index entry-page map of the identified bookkeeping page;
wherein performing the data operation includes accessing the target index entry on the identified index page and obtaining data from the target index entry; and
wherein the computerized method further comprises providing the obtained data in response to the received data operation request.

11. The computerized method of claim 9, wherein the generated data operation is a write operation;
wherein the received data operation request includes data of an index entry to be written, the data including a sort value of the index entry;
wherein identifying the index page includes identifying an index page identifier of the index page using the sort value of the index entry to be written and sort value ranges of index pages of the record index structure stored as metadata in the bookkeeping page;
wherein performing the data operation includes recording the index entry to the identified index page in an order based on the sort value of the index entry relative to sort values of other index entries in the identified index page; and
wherein the computerized method further comprises:
updating metadata of the identified index page, wherein the updated metadata of the identified index page includes at least one of the following: the timestamp, a sort value range, and an index entry count value; and
updating metadata of the bookkeeping page associated with the identified index page to match the updated metadata of the identified index page.

12. The computerized method of claim 11, further comprising:
based on a quantity of index entries stored on the identified index page exceeding a capacity limit, rebalancing the index entries stored on the identified index page, wherein rebalancing the index entries includes:
determining a quantity of index entries that would fill the identified index page to the capacity limit;
creating a new index page in the record index structure; and
moving the quantity of index entries from the identified index page to the new index page; and updating metadata of the identified index page, the new index page, and corresponding metadata on the bookkeeping page based on moving the quantity of index entries.

13. The computerized method of claim 9, wherein the generated data operation is an enumeration operation;
wherein the received data operation request includes query parameters for accessing a plurality of index entries;
wherein the received data operation request includes a continuation token associated with an ongoing enumeration operation;
wherein identifying the index page includes identifying an index page identifier based on the query parameters and identifying a starting index entry based on the continuation token;
wherein performing the data operation includes obtaining data from a quantity of index entries in order starting with the starting index entry, wherein the quantity of index entries is based on the continuation token; and
wherein the computerized method further comprises providing the obtained data from the quantity of index entries and an updated continuation token in response to the received data operation request.

14. The computerized method of claim 9, further comprising:
determining that the timestamp in metadata of the identified index page does not match the corresponding timestamp associated with the identified index page in metadata of the bookkeeping page;
based on determining that the timestamp and corresponding timestamp do not match, performing one of the following:
accessing and compare the timestamp and the corresponding timestamp again; and
responding to the received data operation request with a notification indicating a response to the received data operation request cannot be completed.

15. The computerized method of claim 9, wherein the received data operation request includes another data operation directed to another record index structure and an indicator indicating the operations are to be performed iteratively; and
wherein the computerized method further comprises initiating performance of the other data operation on the other record index structure based on completion of the performance of the data operation.

16. The computerized method of claim 9, wherein a plurality of data operations targeted at a plurality of index pages of the record index structure are generated based on the received data operation request; and
wherein the computerized method further comprises:
generating a Large Index Page Manager (LIPM) instance for each index page of the plurality of index pages; and
performing the plurality of data operations on the plurality of index pages in parallel using the LIPM instances of the plurality of index pages.

17. A computer storage medium having computer-executable instructions that, upon execution by a processor, cause the processor to at least:
generate a data operation based on a received data operation request, wherein the received data operation request includes a bookkeeping page identifier;
identify a bookkeeping page of a record index structure based on the bookkeeping page identifier;
identify an index page of the record index structure with a parameter of the data operation;
determine that a timestamp in metadata of the identified index page matches a corresponding timestamp associated with the identified index page in metadata of the bookkeeping page; and
perform the data operation on the identified index page.

18. The computer storage medium of claim 17, wherein the generated data operation is a read operation;
wherein the received data operation request includes an index entry identifier associated with a target index entry to be read;
wherein identifying the index page includes identifying an index page identifier of the index page using the index entry identifier and an index entry-page map of the identified bookkeeping page;
wherein performing the data operation includes accessing the target index entry on the identified index page and obtaining data from the target index entry; and
wherein the computer-executable instructions, upon execution by the processor, further cause the processor to at least provide the obtained data in response to the received data operation request.

19. The computer storage medium of claim 17, wherein the generated data operation is a write operation;
wherein the received data operation request includes data of an index entry to be written, the data including a sort value of the index entry;
wherein identifying the index page includes identifying an index page identifier of the index page using the sort value of the index entry to be written and sort value ranges of index pages of the record index structure stored as metadata in the bookkeeping page;
wherein performing the data operation includes recording the index entry to the identified index page in an order based on the sort value of the index entry relative to sort values of other index entries in the identified index page; and
wherein the computer-executable instructions, upon execution by the processor, further cause the processor to at least:
update metadata of the identified index page, wherein the updated metadata of the identified index page includes at least one of the following: the timestamp, a sort value range, and an index entry count value; and
update metadata of the bookkeeping page associated with the identified index page to match the updated metadata of the identified index page.

20. The computer storage medium of claim 17, wherein the generated data operation is an enumeration operation;
wherein the received data operation request includes query parameters for accessing a plurality of index entries;
wherein the received data operation request includes a continuation token associated with an ongoing enumeration operation;
wherein identifying the index page includes identifying an index page identifier based on the query parameters and identifying a starting index entry based on the continuation token;
wherein performing the data operation includes obtaining data from a quantity of index entries in order starting with the starting index entry, wherein the quantity of index entries is based on the continuation token; and
wherein the computer-executable instructions, upon execution by the processor, further cause the processor to at least provide the obtained data from the quantity of index entries and an updated continuation token in response to the received data operation request.

\* \* \* \* \*